(12) United States Patent
He

(10) Patent No.: US 9,279,930 B2
(45) Date of Patent: Mar. 8, 2016

(54) LIGHT GUIDE PLATE AND AN EDGE-LIT BACKLIGHT MODULE OF UTILIZING THE SAME

(71) Applicant: SHENZHEN CHINA STAR OPTOELECTRONICS TECHNOLOGY CO., LTD., Shenzhen (CN)

(72) Inventor: Hu He, Shenzhen (CN)

(73) Assignee: SHENZHEN CHINA STAR OPTOELECTRONICS TECHNOLOGY CO., LTD, Shenzhen (CN)

(*) Notice: Subject to any disclaimer, the term of this patent is extended or adjusted under 35 U.S.C. 154(b) by 192 days.

(21) Appl. No.: 14/232,908

(22) PCT Filed: Nov. 19, 2013

(86) PCT No.: PCT/CN2013/087373
§ 371 (c)(1),
(2) Date: Jan. 15, 2014

(87) PCT Pub. No.: WO2015/070468
PCT Pub. Date: May 21, 2015

(65) Prior Publication Data
US 2015/0309240 A1 Oct. 29, 2015

(30) Foreign Application Priority Data

Nov. 14, 2013 (CN) .......................... 2013 1 0567236

(51) Int. Cl.
*F21V 8/00* (2006.01)
(52) U.S. Cl.
CPC ............ *G02B 6/0036* (2013.01); *G02B 6/0058* (2013.01); *G02B 6/0073* (2013.01)
(58) Field of Classification Search
CPC ... G02B 6/0036; G02B 6/0058; G02B 6/0073
See application file for complete search history.

(56) References Cited

U.S. PATENT DOCUMENTS

| 2009/0122229 A1* | 5/2009 | Kim ..................... G02B 6/0038 349/65 |
| 2012/0162281 A1* | 6/2012 | Cho ........................ G09F 13/04 345/690 |

* cited by examiner

*Primary Examiner* — Elmito Breval
(74) *Attorney, Agent, or Firm* — Mark M. Friedman

(57) ABSTRACT

A light guide plate including a light guide plate main body is disclosed. The light guide plate main body has a light emitting plane, a bottom plane opposite to the light emitting plane. According to a scanning mode, the light guide plate main body is divided into a plurality of subsections. Each of the opposite edges of each subsection has a borderline, and two adjacent subsections share a borderline. Furthermore, a plurality of first scattering dots disposed on the subsections of the light guide plate main body, and a plurality of second scattering dots disposed on the borderlines of the light guide plate main body.

13 Claims, 6 Drawing Sheets

LIGHT GUIDE PLATE AND AN EDGE-LIT BACKLIGHT MODULE OF UTILIZING THE SAME

BACKGROUND OF THE INVENTION

1. Field of Invention

The present invention relates to a backlight module of a liquid crystal display (LCD), and more particularly, to a light guide plate and an edge-lit backlight module utilizing the same.

2. Description of Prior Art

The design of an LED's backlight is improved along with the improvement of LED's efficiency, from the earliest four-side type into a two-side type, then into a one-side type, the present technology and the direction of future development focus on a single-short-side type.

With the development of 3D technology, a TV with a 3D display function is also gradually becoming a mainstream. Currently the 3D display modes include shutter (Shutter Glass), polarized FPR (Film-type Patterned Retarder) and other manners.

Shutter-style 3D needs to be achieved by the scanning backlight with a panel pixel scanning. Backlight sources are usually partitioned. LEDs of an edge back-lit style LED light bar are divided into sets to correspond to a plurality of subsections of a screen. When the first frame signal scans the first subsection, the LEDs corresponding to the first subsection are lighted up, and the rest of the LEDs are turned off. When the signal scans the second subsection, only the LEDs corresponding to the second subsection are lighted up. The rest can be deduced accordingly. Such operations are necessary to be conducted for every frame. The display performance of the shutter-style 3D depends on a crosstalk between the subsections and timing setting.

The crosstalk between the subsections related to the backlight mainly comes from the effect of the brightnesses of the different subsections. In the best situation, when the LEDs correspond to one subsection are lighted up, the backlight sources of the other subsections all present a dark mode. FIG. 1 is a side-view of a light guide plate with microstructures of a prior art. It is a common design to dispose saw-shaped microstructures 13 on the light emitting plane 11 of the light guide plate 10. The microstructures 13 on the light guide plate 10 destroy the condition of light total reflection with different geometric shapes. FIG. 2 is a light distribution diagram of a flat light guide plate of a prior art and a light guide plate with wave-shaped micro structures of another prior art. It is clearly observed that the light guide plate with wave-shaped micro structures has a more convergent light distribution than the flat light guide plate, but in practice, it is impossible to restrain the divergence of light with only micro structures.

Further refer to FIG. 3, which is a vertical direction brightness distribution diagram when a common light guide plate with micro structures is lighted up in one LED light source. The width corresponds to the light source (100% brightness) is a point, the width of FWHM (Full Width at Half Maximum; 50% brightness) apparently increases. With further refer to FIG. 4, which is a diagram showing the width of FWHM at different distances from the light source. In a single-short-side edge-lit manner, as the distance increases, the FWHM increases accordingly, which means the crosstalk is more serious at a far side than a light incident side of the single-short-side edge-lit light guide plate.

FIG. 5 is a top view drawing of a backlight module of a prior art. A backlight module 20 comprises a first LED bar 23, a second LED bar 24 and a light guide plate 21. The light guide plate 21 divides into a plurality of long-shaped subsections (R1-R4) which are perpendicular to the first LED bar 23 according to the scanning mode. The meaning of the subsections is the first LED bar 23 and the second LED bar 24 both comprises a plurality of LED light sources. The LED light sources of the first LED bar 23 are divided into several groups of LED light sources, each group of LED light source corresponds to each subsections (R1-R4). Each group of the first LED bar 23 could be on or off, the second LED bar 24 has the same arrangement. With the arrangement of light on certain group of LED light source as above to achieve lighting the certain subsection of the light guide plate 21. But there is crosstalk phenomenon occurs on the board line between the subsections.

In order to solve the crosstalk between subsections, a plurality of circle scattering dots 22 are formed on the light guide plate 21 of the backlight module, the scattering dots have the same interval between each other, and controlling the divergence of light by the change of size of the circle scattering dots 22.

FIG. 6 is a top view drawing of a backlight module of another prior art. The backlight module 30 comprises a first LED bar 33, a second LED bar 34 and a light guide plate 31. The difference to FIG. 5 is a plurality of long-shaped scattering dots 32, the long-shaped scattering dots 32 have the same interval, and controlling the divergence of light by the change of length of the circle scattering dots 32 parallel to the first LED bar 33.

Moreover, the divergence of light could be controlled by the same size of scattering dots, different interval. But, there is still certain crosstalk between the subsections even combining the above 3 kinds of scattering dots applying on the light guide plate, the reason is the angle of light is inevitably divergent while the light entering into the light guide plate, by the arrangement of scattering dots mentioned above is still impossible to control the divergence of light effectively.

BRIEF SUMMARY OF THE INVENTION

The purpose of the present invention is to provide a light guide plate and an edge-lit backlight module utilizing the same prevents the light from over divergent and causing crosstalk.

To achieve above purpose. The present invention provide a light guide plate comprising: a light guide plate main body having a light emitting plane, a bottom plane opposite to the light emitting plane, the light guide plate main body being divided into a plurality of subsections according to a scanning mode, the opposite edges of each subsection has a borderline, and adjacent two subsections share a borderline; a plurality of first scattering dots disposed on the subsections of the light guide plate main body; and a plurality of second scattering dots disposed on the borderlines of the light guide plate main body, the second scattering dots being long-shaped micro structures, the micro structures being concave inward from at least one of the light emitting plane or the bottom plane of the light guide plate main body, and a long direction of the second scattering dots being parallel to the borderline.

The long-shaped micro structure has a depth of 20-200 μm, a width of 30-200 μm, and a length of 200-1200 μm.

A light guide plate comprising: a light guide plate main body having a light emitting plane, a bottom plane opposite to the light emitting plane, the light guide plate main body being divided into a plurality of subsections according to a scanning mode, the opposite edges of each subsection has a borderline, and adjacent two subsections share a borderline; a plurality of first scattering dots disposed on the subsections of the light guide plate main body; and a plurality of second scattering dots disposed on the borderlines of the light guide plate main body.

The second scattering dots disposed on at least one of the light emitting plane or the bottom plane of the light guide plate main body.

The second scattering dots being long-shaped micro structures, the micro structures being concave inward from at least one of the light emitting plane or the bottom plane of the light guide plate main body.

The long-shaped micro structure has a depth of 20-200 μm, a width of 30-200 μm, and a length of 200-1200 μm.

A long direction of the second scattering dots is parallel to the borderline.

An edge-lit backlight module comprising: a light guide plate main body having a first light incident plane, a second light incident plane opposite to the first light incident plane, a light emitting plane connecting the first light incident plane and the second light incident plane and a bottom plane connecting the first light incident plane and the second light incident plane and opposite to the light emitting plane, the light guide plate main body being divided into a plurality of subsections according to a scanning mode, the opposite edges of each subsection has a borderline, and adjacent two subsections share a borderline; a first LED bar disposed near to the first light incident plane of the light guide plate main body; a plurality of first scattering dots disposed on the subsections of the light guide plate main body; and a plurality of second scattering dots disposed on the borderlines of the light guide plate main body.

The second scattering dots disposed on at least one of the light emitting plane or the bottom plane of the light guide plate main body.

The second scattering dots being long-shaped micro structures, the micro structures being concave inward from at least one of the light emitting plane or the bottom plane of the light guide plate main body.

The long-shaped micro structure has a depth of 20-200 μm, a width of 30-200 μm, and a length of 200-1200 μm.

A long direction of the second scattering dots is parallel to the borderline.

The edge-lit backlight module further comprises a second LED bar disposed near to the second light incident plane of the light guide plate main body.

With the technology proposal of the present invention, the advantage effect is to lower the crosstalk between subsections, and increasing the display effect of shutter style 3D.

DETAILED DESCRIPTION OF THE PREFERRED EMBODIMENTS

Figure 1:
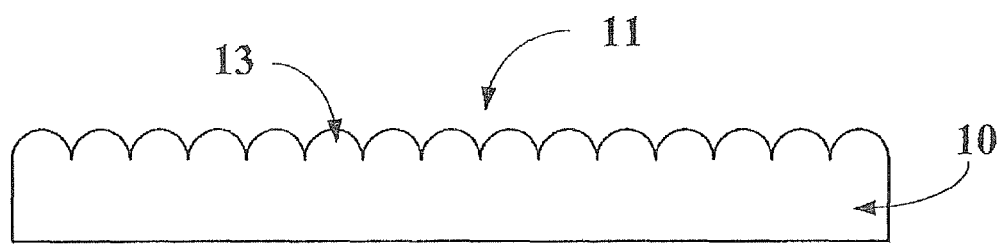
FIG. 1 is a side-view of a light guide plate with micro structures of a prior art.
Figure 2:
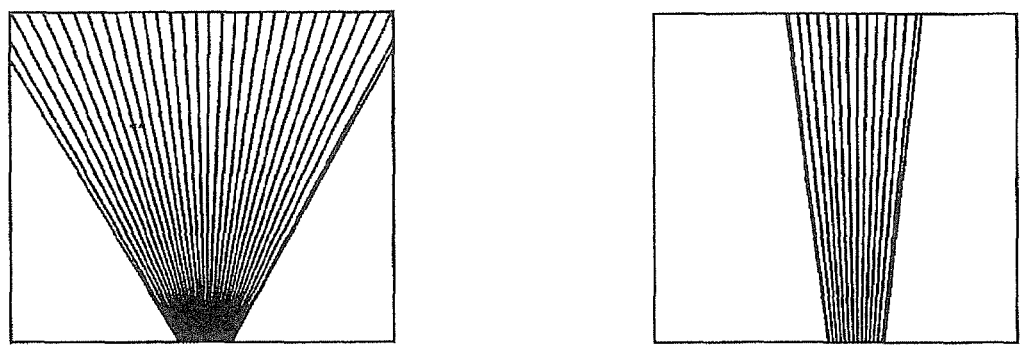
FIG. 2 is a light distribution diagram of a flat light guide plate of a prior art and a light guide plate with wave-shaped micro structures of another prior art.
Figure 3:
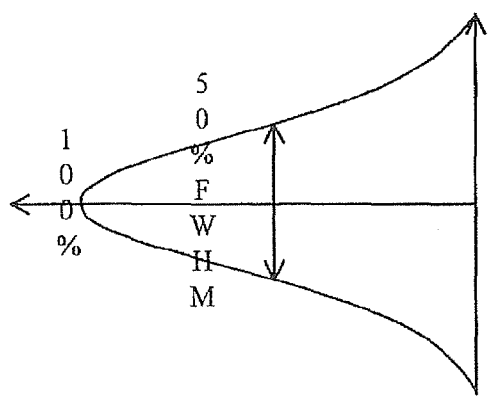
FIG. 3 is a vertical direction brightness distribution diagram when a common light guide plate with micro structures lights up in one subsection.
Figure 4:
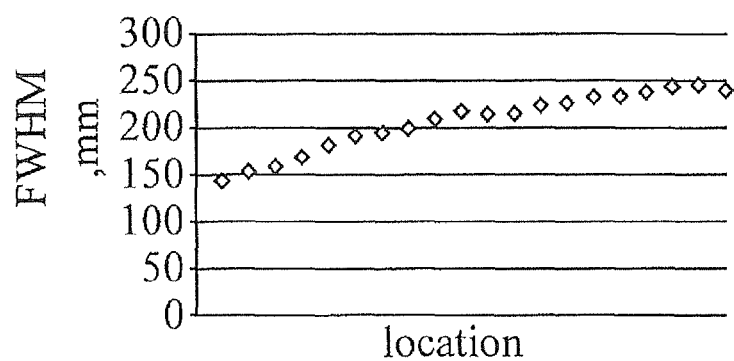
FIG. 4 is a diagram showing the width of FWHM at different distance from the light source.
Figure 5:
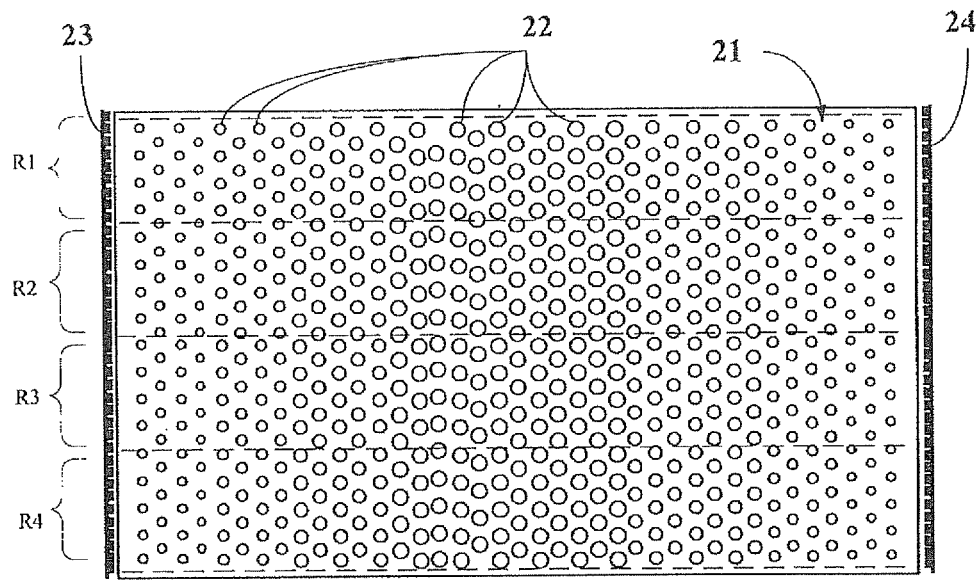
FIG. 5 is a top view drawing of a backlight module of a prior art.
Figure 6:
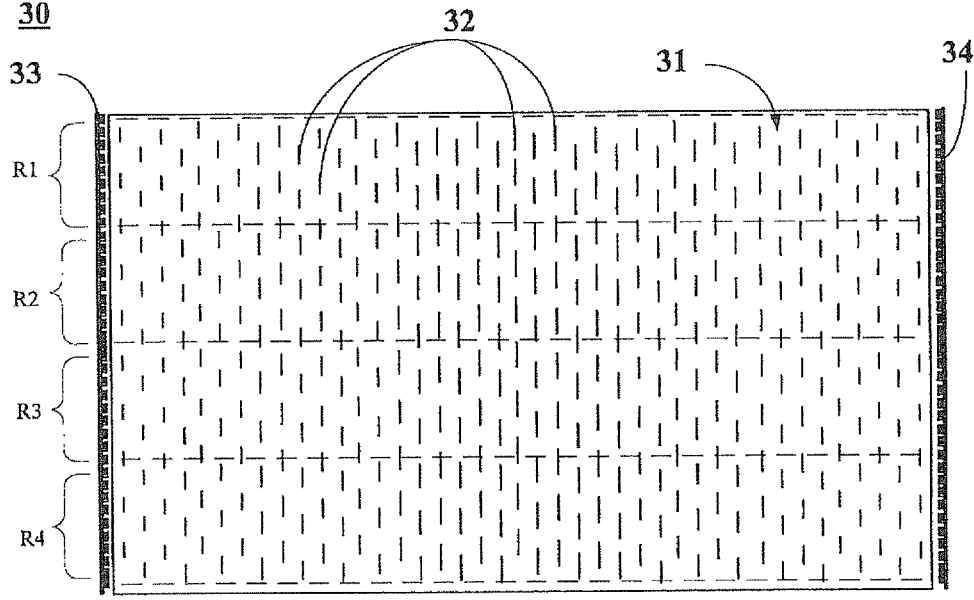
FIG. 6 is a top view drawing of a backlight module of another prior art.

The following description of every embodiment, with reference to the accompanying drawings, is used to exemplify a specific embodiment which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention. In the drawings, the components having similar structures are denoted by the same numerals.

Figure 7:
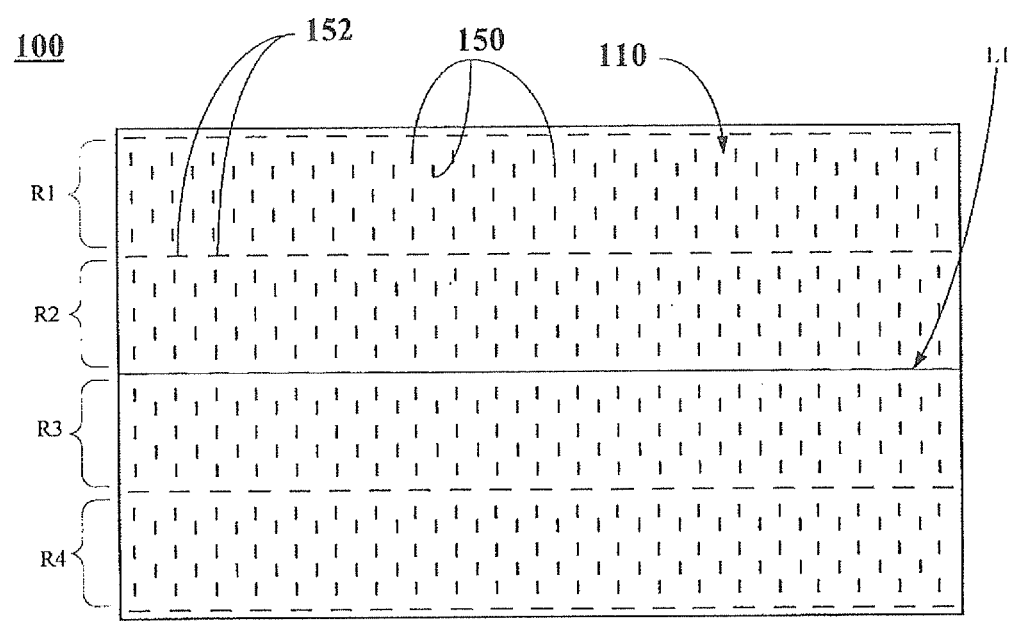
FIG. 7 is a top view drawing of the backlight module of a first embodiment of the present invention.
Figure 8:
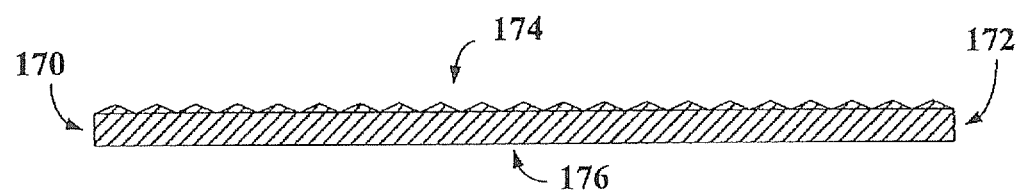
FIG. 8 is a side view drawing of the backlight module of a first embodiment of the present invention.

Refer to FIG. 7 and FIG. 8. FIG. 7 is a top view drawing of the backlight module of a first embodiment of the present invention; FIG. 8 is a side view drawing of the backlight module of a first embodiment of the present invention. A light guide plate 100 comprising: a light guide plate main body 110, a plurality of first scattering dots 150 and a plurality of second scattering dots 152. It has very good effect about lowering the crosstalk by disposing the 2 kinds of scattering dots, describes detail later.

The light guide plate main body 110 comprises a first light incident plane 170, a second light incident plane 172 opposite to the first light incident plane 170, a light emitting plane 174 connecting to the first light incident plane 170 and the second light incident plane 172 and a bottom plane 176 connecting the first light incident plane 170 and the second light incident plane 172 and opposite to the light emitting plane 174. A first LED bar (not shown) disposed near to the first light incident plane 170 comprises a plurality of LED light source groups which could turn on group by group, dividing the light guide plate main body 110 perpendicular with the direction of the first light incident plane 170 into several long-shaped subsections (R1-R4) according to a scanning mode, the opposite edges of each subsections (R1-R4) has a borderline (take L1 for all borderlines), and adjacent two subsections share the same borderline L1. There could be saw-shaped, wave-shaped or any suitable micro structures on the light emitting plane 174. There is saw-shaped micro structure on the light emitting plane 174 in the first embodiment of the present invention.

The first scattering dots 150 disposed on the bottom plane 176 of the light guide plate main body 110, wherein the first scattering dots 150 are enforced in long-shaped micro structures perpendicular to the borderline L1, disposing on the entire area of the bottom plane 176 with equal intervals.

The second scattering dots 152 dispose on the bottom plane 176 of the light guide plate main body 110, wherein the second scattering dots 152 are enforced in long-shaped micro structures parallel to the borderline L1, disposing on the borderlines of the bottom plane 176 with equal intervals.

Figure 9:
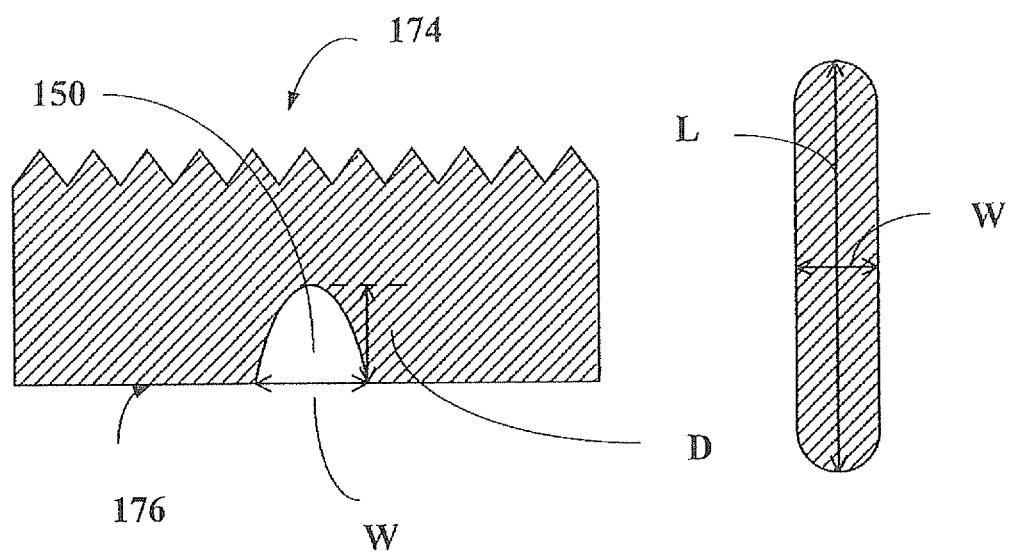
FIG. 9 is an illustrating drawing of the scattering dot of a first embodiment of the present invention.

FIG. 9 is an illustrating drawing of the scattering dot of a first embodiment of the present invention. The first scattering dots 150 and the second scattering dots 152 disposed on the bottom plane 176 of the light guide plate main body 110, and conventional saw-shaped micro structures disposed on the light emitting plane 174. Please note that the function of the saw-shaped micro structures are the same as the wave-shaped micro structures mentioned above, the saw-shaped micro structures are for reference only, not to limit disposing any conventional micro structures. The first scattering dots 150 and the second scattering dots 152 are enforced in long-shaped and concave micro structure. Preferably, with a depth of 20-200 μm, a width of 30-200 μm, a length of 200-1200 μm.

Figure 10:
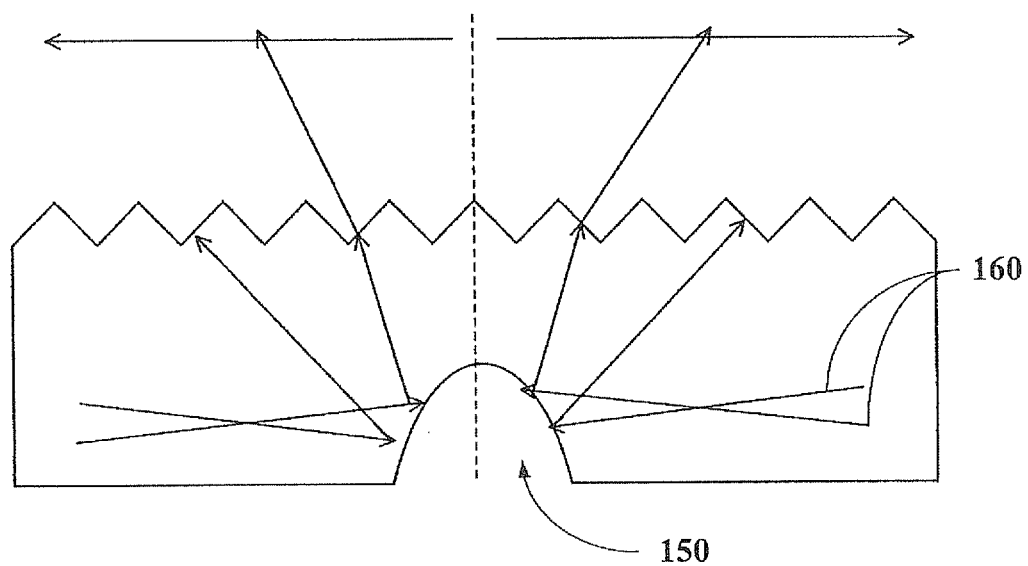
FIG. 10 is an illustrating view drawing of reflecting path of light of a first embodiment of the present invention.

FIG. 10 is an illustrating view drawing of reflecting path of light of a first embodiment of the present invention. With the arrangement of the length, width and depth of the second scattering dots 152, making the light 160 still perpendicular to the second scattering dots 152 after reflecting on the second scattering dots 152 without destroying the regulated direction of light 160 passing through the first light incident plane (not shown).

Comparing the first embodiment of the present invention with the prior art, decreasing the possibility of the light 160 passing through the neighbor subsections (R1-R4) by disposing the second scattering dots 152 on the borderlines L1, lowering the crosstalk between subsections and providing the better display effect.

Figure 11:
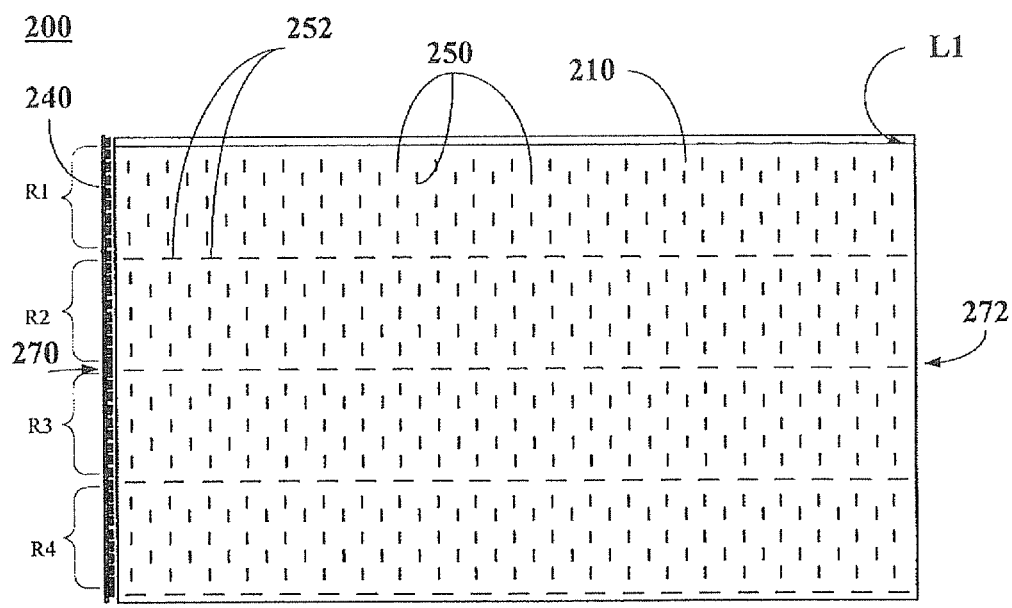
FIG. 11 is a top view drawing of the backlight module of a second embodiment of the present invention.

FIG. 11 is a top view drawing of the backlight module of a second embodiment of the present invention. According to the second embodiment of the present invention, a backlight module 200 comprises a light guide plate main body 210 the same as the light guide plate main body 110 of the first embodiment of the present invention, with adding a first LED bar 240. By using the same light guide plate main body 210 as the light guide plate main body 110 of the first embodiment of the present invention and disposing the second scattering dots on the borderlines to reflect light cross the subsections (R1-R4), converging the light, lowering the divergence of light and crosstalk.

Figure 12:
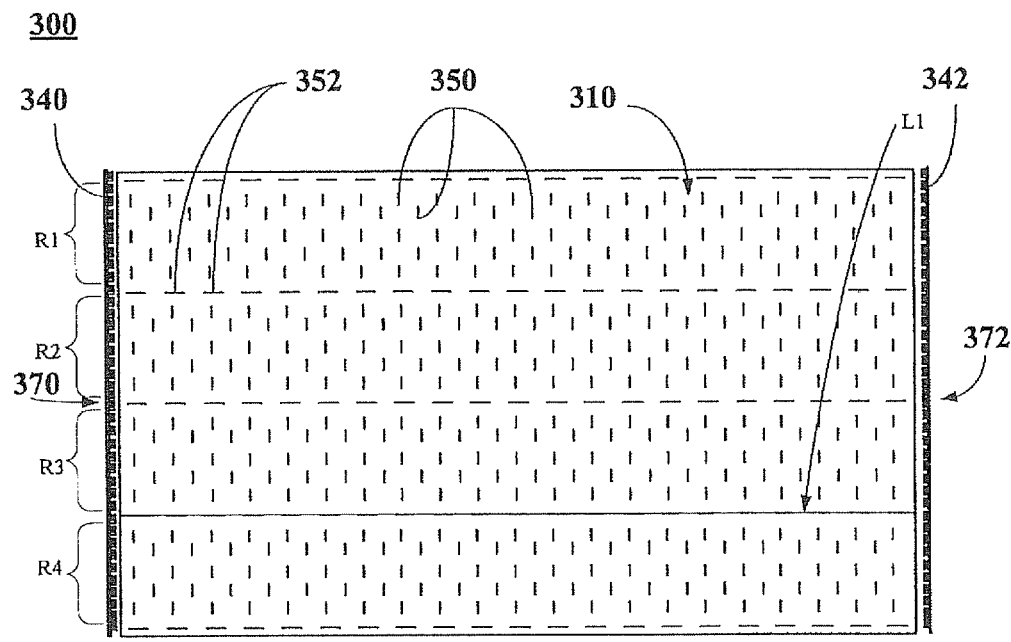
FIG. 12 is a top view drawing of the backlight module of a third embodiment of the present invention.

FIG. 12 is a top view drawing of the backlight module of a third embodiment of the present invention. According to the third embodiment of the present invention, a backlight module 300 comprises a light guide plate main body 310 the same as the light guide plate main body 210 of the second embodiment of the present invention, with adding a second LED bar 342. By using the same light guide plate main body 310 as the light guide plate main body 210 of the second embodiment of the present invention, comparing a two-side type backlight module as the third embodiment of the present invention with the second embodiment of the present invention, the crosstalk caused at the far side (near a second light incident plane 372) by a first LED bar 340 could be lowered by disposing the second LED bar 342; in contrast, the crosstalk caused at the far side (near a first light incident plane 370) by the second LED bar 342 could be lowered by disposing the first LED bar 340, achieving a better display effect.

Figure 13:
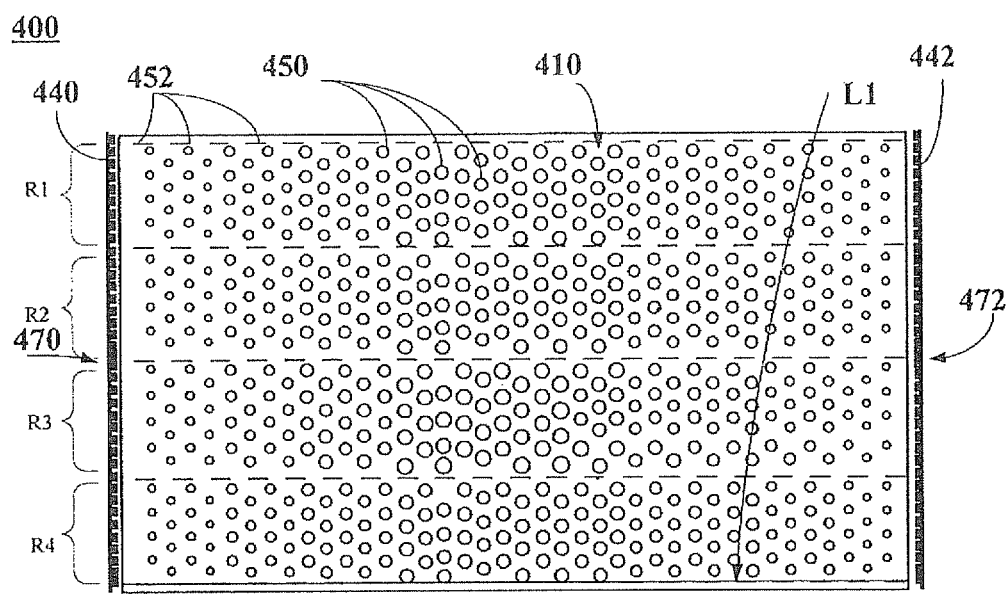
FIG. 13 is a top view drawing of the backlight module of a forth embodiment of the present invention.

FIG. 13 is a top view drawing of the backlight module of a forth embodiment of the present invention. According to the forth embodiment of the present invention, the difference between a backlight module 400 and the third embodiment of the present invention is disposing different shape of a first scattering dots 450, by using different size of the first scattering dots 450 in the forth embodiment of the present invention to replace the different length of a first scattering dots 350 in the third embodiment of the present invention, achieving a better convergent effect corresponding to different arrangement of LED bar comparing to the third embodiment of the present invention.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A light guide plate comprising:
a light guide plate main body having a light emitting plane, a bottom plane opposite to the light emitting plane, the light guide plate main body being divided into a plurality of subsections according to a scanning mode, each of opposite edges of each subsection having a borderline, and adjacent two subsections sharing a borderline;
a plurality of first scattering dots discontinuously disposed on the subsections of the light guide plate main body; and
a plurality of second scattering dots disposed on the borderlines of the light guide plate main body, the second scattering dots being long-shaped microstructures, the microstructures being concave inward from at least one of the light emitting plane or the bottom plane of the light guide plate main body, and a long direction of the second scattering dot being parallel to the borderline.

2. The light guide plate according to claim 1, wherein the long-shaped micro structure has a depth of 20-200 μm, a width of 30-200 μm, and a length of 200-1200 μm.

3. A light guide plate comprising:
a light guide plate main body having a light emitting plane, a bottom plane opposite to the light emitting plane, the light guide plate main body being divided into a plurality of subsections according to a scanning mode, each of opposite edges of each subsection having a borderline, and adjacent two subsections sharing a borderline;
a plurality of first scattering dots discontinuously disposed on the subsections of the light guide plate main body; and
a plurality of second scattering dots disposed on the borderlines of the light guide plate main body.

4. The light guide plate according to claim 3, wherein the second scattering dots disposed on at least one of the light emitting plane or the bottom plane of the light guide plate main body.

5. The light guide plate according to claim 4, wherein the second scattering dots being long-shaped micro structures, the micro structures being concave inward from at least one of the light emitting plane or the bottom plane of the light guide plate main body.

6. The light guide plate according to claim 5, wherein the long-shaped micro structure has a depth of 20-200 μm, a width of 30-200 μm, and a length of 200-1200 μm.

7. The light guide plate according to claim 5, wherein a long direction of the second scattering dots being parallel to the borderline.

8. An edge-lit backlight module comprising:
a light guide plate main body having a first light incident plane, a second light incident plane opposite to the first light incident plane, a light emitting plane connecting the first light incident plane and the second light incident plane and a bottom plane connecting the first light incident plane and the second light incident plane and opposite to the light emitting plane, the light guide plate main body being divided into a plurality of subsections according to a scanning mode, each of the opposite edges of each subsection having a borderline, and adjacent two subsections sharing a borderline;
a first LED bar disposed near to the first light incident plane of the light guide plate main body;
a plurality of first scattering dots discontinuously disposed on the subsections of the light guide plate main body; and
a plurality of second scattering dots disposed on the borderlines of the light guide plate main body.

9. The edge-lit backlight module according to claim 8, wherein the second scattering dots disposed on at least one of the light emitting plane or the bottom plane of the light guide plate main body.

10. The edge-lit backlight module according to claim 9, wherein the second scattering dots being long-shaped micro structures, the micro structures being concave inward from at least one of the light emitting plane or the bottom plane of the light guide plate main body.

11. The edge-lit backlight module according to claim 10, wherein the long-shaped micro structure has a depth of 20-200 μm, a width of 30-200 μm, and a length of 200-1200 μm.

12. The edge-lit backlight module according to claim 10, wherein a long direction of the second scattering dots being parallel to the borderline.

13. The edge-lit backlight module according to claim 8, wherein the edge-fit backlight module further comprises a second LED bar disposed near to the second light incident plane of the light guide plate main body.

\* \* \* \* \*